US012354254B2

(12) United States Patent
Basistyy et al.

(10) Patent No.: US 12,354,254 B2
(45) Date of Patent: Jul. 8, 2025

(54) LOW CONTRAST NON-REFERENTIAL DEFECT DETECTION

(71) Applicant: Onto Innovation Inc., Wilmington, MA (US)

(72) Inventors: Roman S. Basistyy, Sunny Isles Beach, FL (US); Jatinder Dhaliwal, Wilmington, MA (US); Jian Ding, Methuen, MA (US)

(73) Assignee: Onto Innovation Inc., Wilmington, MA (US)

( * ) Notice: Subject to any disclaimer, the term of this patent is extended or adjusted under 35 U.S.C. 154(b) by 431 days.

(21) Appl. No.: 17/867,444

(22) Filed: Jul. 18, 2022

(65) Prior Publication Data

US 2023/0012917 A1     Jan. 19, 2023

Related U.S. Application Data

(60) Provisional application No. 63/223,121, filed on Jul. 19, 2021.

(51) Int. Cl.
  *G06T 7/00*      (2017.01)
  *G06T 5/20*      (2006.01)
  *G06T 7/10*      (2017.01)

(52) U.S. Cl.
  CPC .............. *G06T 7/0008* (2013.01); *G06T 5/20* (2013.01); *G06T 7/10* (2017.01);
  (Continued)

(58) Field of Classification Search
  CPC .......... G06T 7/0008; G06T 5/20; G06T 7/10; G06T 2207/20021; G06T 2207/20081; G06T 2207/30148; G06T 7/11; G06T 7/0004; G06T 7/35; G06T 5/92; G06T 2207/20084; G01N 21/88
  See application file for complete search history.

(56) References Cited

U.S. PATENT DOCUMENTS

| 8,107,717 B2 | 1/2012 | Maeda et al. |
| 10,181,185 B2 | 1/2019 | Park et al. |

(Continued)

FOREIGN PATENT DOCUMENTS

| CN | 111480179 A | 7/2020 |
| CN | 112164074 A | 1/2021 |

(Continued)

OTHER PUBLICATIONS

Gao, Shijia, et al., "SolderJoint Defect Detection Based on Image Segmentation and Deep Learning", 2019 IEEE International Conference on Signal, Information and Data Processing (ICSIDP), (Dec. 11-13, 2019), (2019) (Year: 2019).*

(Continued)

*Primary Examiner* — S J Park
*Assistant Examiner* — Caroline E. Depalma
(74) *Attorney, Agent, or Firm* — Schwegman Lundberg & Woessner, P.A.

(57) ABSTRACT

Defect detection techniques can be used for inspecting semiconductor devices, such as CMOS image sensors, during the manufacturing process. The defects can include common defects, such as scratches, dirt, etc., as well as low-contrast defects, such as watermarks. The detection technique may use a supervised machine learning network.

23 Claims, 7 Drawing Sheets

(52) U.S. Cl.
CPC .............. *G06T 2207/20021* (2013.01); *G06T 2207/20081* (2013.01); *G06T 2207/30148* (2013.01)

(56) References Cited

U.S. PATENT DOCUMENTS

| | | |
|---|---|---|
| 10,387,755 B2 | 8/2019 | Bhaviripudi et al. |
| 10,599,951 B2 | 3/2020 | Bhaskar et al. |
| 2017/0364798 A1 | 12/2017 | Karlinsky et al. |
| 2018/0107928 A1 | 4/2018 | Zhang et al. |
| 2019/0197679 A1 | 6/2019 | Fang et al. |
| 2019/0287021 A1 | 9/2019 | Chiang et al. |
| 2019/0333197 A1 | 10/2019 | Kask et al. |
| 2020/0211188 A1 | 7/2020 | Gao et al. |
| 2020/0327654 A1 | 10/2020 | Zhang et al. |

FOREIGN PATENT DOCUMENTS

| | | |
|---|---|---|
| CN | 112219221 | 1/2021 |
| CN | 117957436 | 4/2024 |
| EP | 0093422 B1 | 10/1987 |
| JP | H06138450 | 5/1994 |
| JP | 2001015564 | 1/2001 |
| JP | 2006266872 | 10/2006 |
| JP | 2007309679 | 11/2007 |
| JP | 5662146 | 12/2014 |
| JP | 2024527847 | 7/2024 |
| JP | 7618889 | 1/2025 |
| KR | 20100121250 | 11/2010 |
| KR | 20200039049 | 4/2020 |
| TW | 202314234 | 4/2023 |
| WO | 2020244795 | 12/2020 |
| WO | 2021083581 | 5/2021 |
| WO | 2023004294 | 1/2023 |

OTHER PUBLICATIONS

Gao, Shijia, et al., "Solder Joint Defect Detection Based on Image Segmentation and Deep Learning", 2019 IEEE International Conference on Signal, Information and Data Processing (ICSIDP), (Dec. 11-13, 2019), (2019).

Li, Cong, et al., "Low-Contrast Defects Recognition Using Low-order Residual Networks", IEEE Access(r), vol. 7, (2019), 91193-91201.

Nakazawa, Takeshi, et al., "Anomaly Detection and Segmentation for Wafer Defect Patterns Using Deep Convolutional Encoder-Decoder Neural Network Architectures in Semiconductor Manufacturing", IEEE Transactions on Semiconductor Manufacturing, 32(2), (May 2019), 250-256.

"International Application Serial No. PCT US2022 073857, International Search Report mailed Nov. 4, 2022", 4 pgs.

"International Application Serial No. PCT US2022 073857, Written Opinion mailed Nov. 4, 2022", 4 pgs.

"Taiwanese Application Serial No. 111127063, Office Action mailed Feb. 6, 2023", with manual English translation, 25 pages.

"Taiwanese Application Serial No. 111127063, Response filed Apr. 27, 2023 to Office Action mailed Feb. 6, 2023", with English claims, 14 pages.

"Taiwanese Application Serial No. 111127063, Decision of Rejection mailed Nov. 1, 2023", with manual English translation, 14 pages.

"International Application Serial No. PCT US2022 073857, International Preliminary Report on Patentability mailed Feb. 1, 2024", 6 pgs.

"Taiwanese Application Serial No. 111127063, Office Action mailed May 8, 2024", with manual English translation, 32 pages.

"European Application Serial No. 22846779.1, Response to Communication pursuant to Rules 161(2) and 162 EPC filed Aug. 16, 2024", 11 pgs.

"Taiwanese Application Serial No. 111127063, Response filed Nov. 7, 2024 to Office Action mailed May 8, 2024", with English claims, 17 pages.

Yang, Chen, "Machine Learning and Computer Vision for PCB Verification", Degree Project in Technology, Second Cycle, KTH Royal Institute of Technology, Stockholm, Sweden, (2020), 62 pages.

\* cited by examiner

LOW CONTRAST NON-REFERENTIAL DEFECT DETECTION

CROSS-REFERENCE TO RELATED APPLICATION

This application claims the benefit of priority to U.S. Provisional Patent Application Ser. No. 63/223,121 filed Jul. 19, 2021, the contents of which are incorporated herein by reference in its entirety.

TECHNICAL FIELD

The present disclosure generally relates to defect detection of semiconductor devices, in particular low-contrast defects.

BACKGROUND

As semiconductor devices decrease in size and increase in complexity, even small defects can adversely impact their performance. For example, some devices undergo water scrubbing or cleaning during manufacturing, which can leave watermark defects. These defects are considered an example of low-contrast defects because the contrast difference between the defect and non-defect area is minimal, making them difficult to detect. Semiconductor devices are frequently inspected during the manufacturing process to detect defects.

But some inspection techniques have difficulty detecting low-contrast defects with accuracy. Moreover, some inspection techniques can use a reference image to detect variations or defects, making them hard to use.

SUMMARY

This disclosure describes a method to detect a defect in a semiconductor device, the method comprising: generating a plurality of binary slices of an image of the semiconductor device; segmenting each binary slice of the plurality of binary slices into segments based on statistical contrast properties of the image; inputting a subset of the segments into a machine learning network, wherein the subset of the segments include segments with a higher contrast profile as compared to other segments not included in the subset; and receiving an output of the machine learning network identifying presence or absence of at least one defect in the image.

This disclosure also describes an inspection system including a detector to capture an image of a semiconductor device; one or more processors of a machine; and a memory storing instructions that, when executed by the one or more processors, cause the machine to perform operations comprising: generating a plurality of binary slices of an image of the semiconductor device; segmenting each binary slice of the plurality of binary slices into segments based on statistical contrast properties of the image; inputting a subset of the segments into a machine learning network, wherein the subset of the segments include segments with a higher contrast profile as compared to other segments not included in the subset; and receiving an output of the machine learning network identifying presence or absence of at least one defect in the image.

This disclosure further describes a machine-storage medium embodying instructions that, when executed by a machine, cause the machine to perform operations comprising: generating a plurality of binary slices of an image of the semiconductor device; segmenting each binary slice of the plurality of binary slices to create segments based on statistical contrast properties of the image; inputting a subset of the segments into a machine learning network, wherein the subset of the segments include segments with a higher contrast profile as compared to other segments not included in the subset; and receiving an output of the machine learning network identifying presence or absence of at least one defect in the image.

BRIEF DESCRIPTION OF THE DRAWINGS

Various ones of the appended drawings merely illustrate example implementations of the present disclosure and should not be considered as limiting its scope.

DETAILED DESCRIPTION

Disclosed herein are examples of defect detection techniques for inspecting semiconductor devices, such as CMOS image sensors, during the manufacturing process. The defects can include common defects, such as scratches, dirt, etc., as well as low-contrast defects, such as watermarks. The detection technique may use a supervised machine learning network to detect defects without using a reference image.

Training and normal operation modes of the detection technique are described. First, the machine learning network is configured and trained to detect various defects during a training mode. In the training mode, one or more training images of the type of semiconductor device (e.g., die) to be inspected is used. The training image may undergo preprocessing to enhance the contrast of the image and other type of transformations to enhance one or more particular features of the image. Binary slices may be taken of the image, each binary slice corresponding to a different range of grayscale levels. Each binary slice may then be segmented using statistical properties, where each segment is defined by a contrast profile for that region of the image. The segment(s) with a known defect are labeled accordingly and segments with no known defect are also labeled accordingly. The segments are fed into a multi-layered machine learning network, and the output is set based on the labels (e.g., defect or no defect). The machine learning network trains itself to detect the defects based on the segments and the defect labels of the segments.

Second, in normal operation mode, the first few steps of pre-processing, binary slicing, and segmenting may be performed in a similar manner as in training mode, which are performed based on pre-defined rules and algorithm. A subset of segments based on relative contrast profiles may then be fed into the trained machine learning network. Based on its training and configuration, the machine learning network may then detect defects in images of the semiconductor devices during inspection. Thus, the detection technique can detect low-contrast defects in a fast, accurate manner without using a reference image.

Figure 1:
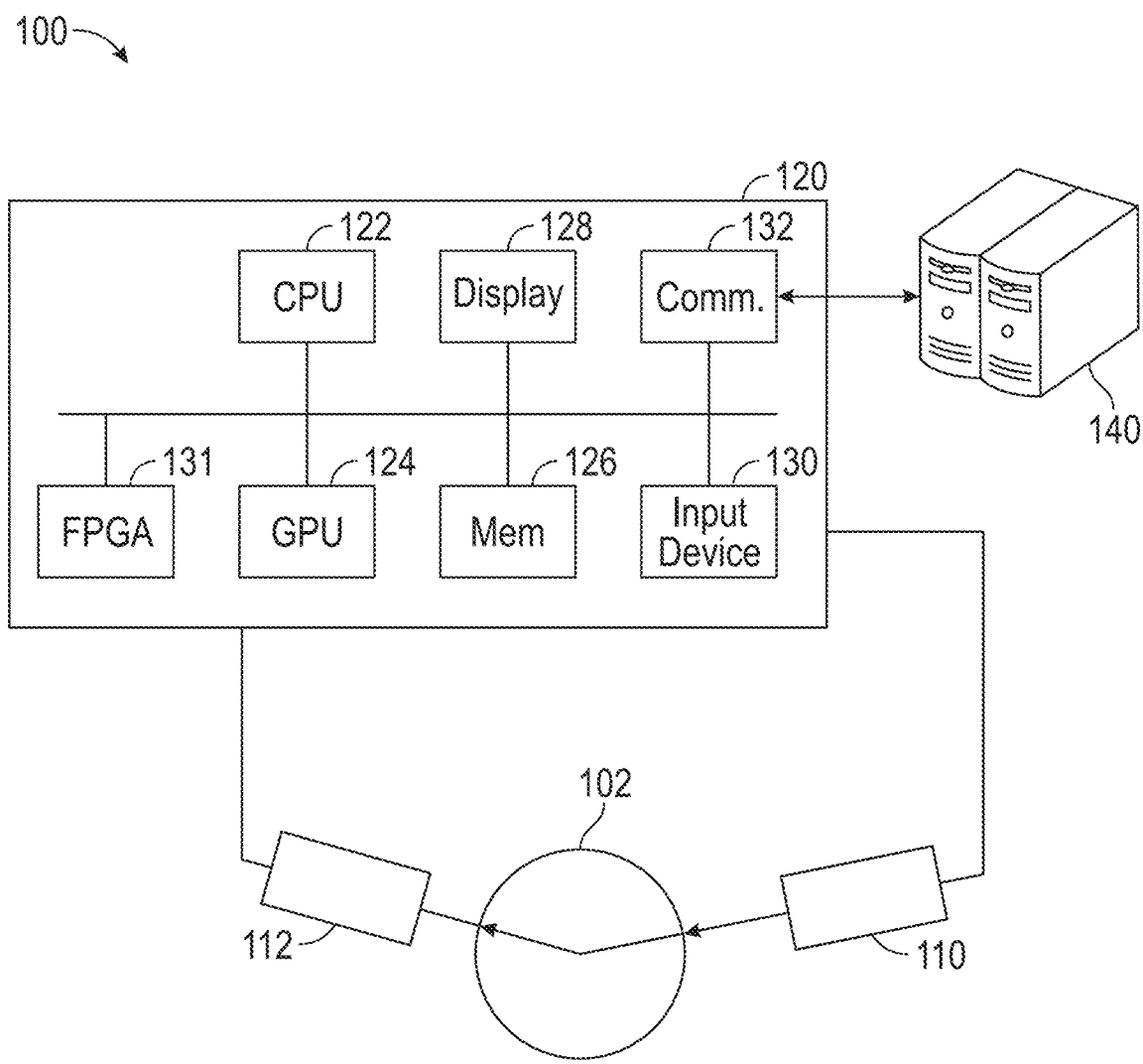
FIG. 1 illustrates an inspection system, according to an example of the present subject matter.

FIG. 1 illustrates example portions of an inspection system 100, such as can be used to perform one or more techniques showed and described elsewhere herein. In this example, the inspection system 100 is shown inspecting a substrate 102, such as a semiconductor die (e.g., for a CMOS image sensor).

The inspection system 100 may include an illumination source 110 to emit a beam of radiation (e.g., electromagnetic waves) projecting onto the substrate 102. The beam of radiation may be considered as producing an interrogation beam to interrogate the surface of the substrate. The illumination source 110 may include a monochromatic or broadband light source. For example, the illumination source 110 can be a LED or multiple LEDs operating at one or more wavelength ranges. In another example, the illumination source 110 may include multiple light sources to provide radiation beams at different wavelengths, intensities, polarization states, etc.

The inspection system 100 may also include a detector 112 to detect and collect re-radiation (e.g., returned electromagnetic waves or secondary electromagnetic waves) from the substrate 102 and generate an image of the substrate 102 or a portion thereof. The detector 112 may include a 2D camera, such as CMOS-based camera or a TDI (time delay and integration) line-scan camera. The detector 112 may include optical and filtering components for collecting and focusing the re-radiation from the substrate 102 onto an image sensor (such as a CCD array or a CMOS or other field-effect transistor element) contained within the detector 112.

In embodiments, the detector 112 may also include one or more camera lenses. The detector 112 may be mounted such that the image sensor (e.g., the CCD array or the CMOS elements) contained therein is at a predetermined angle with reference to an imaginary line that is normal to a top surface of the substrate 102 (e.g., at a 450 angle with regard to the surface normal). In embodiments, the detector 112 may also include multiple cameras, with each camera mounted at the same or a different predetermined angle with reference to the surface normal.

The detector 112 may be coupled to a test instrument 120. The test instrument 120 may include a computer processing unit (CPU) 122, a graphic processing unit (GPU) 124, a field programmable gate array (FPGA) 131 (or other suitable accelerators such as a data processing unit (DPU), artificial neuron network (ANN) and the like), a memory 126, a display 128, an input device 130, and a communication interface 132 (e.g., high performance network (HPC)). The test instrument 120 can also include front-end circuitry such as transmit signal chains, receive signal chains, switch circuitry, digital and analog circuitry, etc. The transmit signal chain may provide control signals for the illumination source 110. The receive signal chain may receive image signals from the detector 112.

The front-end circuitry may be coupled to and controlled by one or more processor circuits, such as the CPU 122, GPU 124, and FPGA 131. The CPU 122 may be provided as one or more multi-core processors. The GPU 124 and FPGA 131 may be used to accelerate the processing of image data and the performance of the machine learning network as described herein. The techniques shown and described herein can be executed by the CPU 122 working in conjunction with the GPU 124 for faster processing.

The CPU 122 and GPU 124 may be coupled to the memory 126, such as to execute instructions that cause the test instrument 120 to perform one or more of beam transmission, radiation/image acquisition, processing, or storage of data relating to inspection, or to otherwise perform techniques as shown and described herein. The test instrument 120 can be communicatively coupled to other portions of the system 100, such as using a wired or wireless communication interface 132.

For example, performance of one or more techniques as shown and described herein can be accomplished on-board the test instrument 120 or using other processing or storage facilities such as using a compute facility 140 (e.g., a general-purpose computing device such as a server, cloud processing system, data warehouse, laptop, tablet, smartphone, desktop computer, or the like). For example, processing tasks that would be undesirably slow if performed on-board the test instrument 120 or beyond the capabilities of the test instrument 120 can be performed remotely (e.g., on a separate system), such as in response to a request from the test instrument 120. Similarly, storage of imaging data or intermediate data can be accomplished using remote facilities communicatively coupled to the test instrument 120. The test instrument 120 may also include the display 128, such as for presentation of configuration information or results, and the input device 130 such as including one or more of a keyboard, trackball, function keys or soft keys, mouse-interface, touch-screen, stylus, or the like, for receiving operator commands, configuration information, or responses to queries.

As described above, the test instrument 120 may receive one or more images of the substrate 102 under inspection. The test instrument 120 may perform one or more techniques as shown and described herein to detect defects, including low-contrast defects, in the one or more images.

Figure 2:
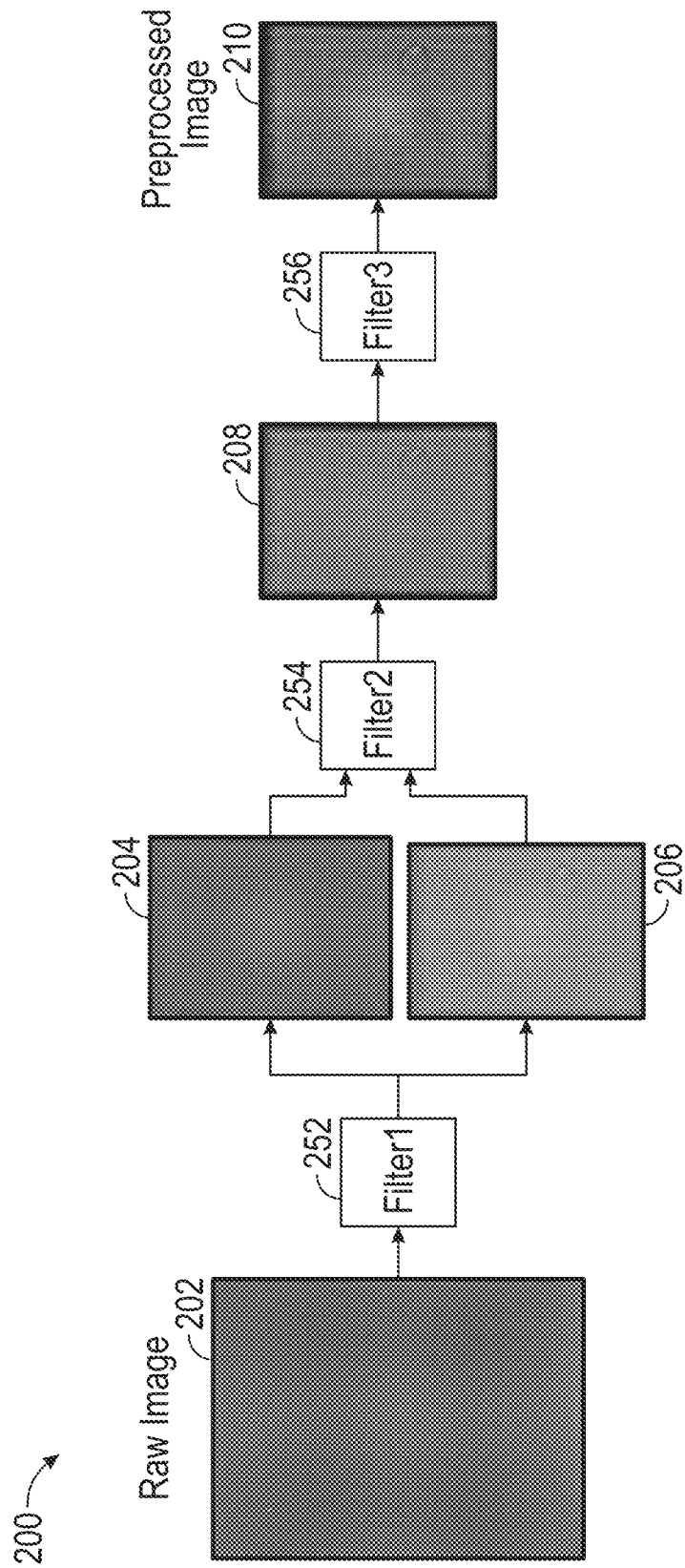
FIG. 2 illustrates a preprocessing process, according to an example of the present subject matter.

FIG. 2 illustrates a preprocessing process 200 of an image, according to an example of the subject matter. A raw image 202 may be obtained. For example, the raw image 202 may be generated by a detector of an inspection system, as described above with reference to FIG. 1 (e.g., detector 112). In an example, the raw image 202 may be manipulated by transformation techniques to form a transformed image in an abstract Hilbert space. For example, the transformation may include Fourier transformation, Laplace transformation, 2D correlation with known shapes that are theoretically generated or empirically obtained, or other suitable transformation techniques. For color images, these process may apply to one or a combination of the original colors provided by the camera.

The raw image 202 (or transformed image) may then be filtered by one or more filters in real space and/or Hilbert space, including linear and non-linear filters. For example, the raw image 202 (or transformed image) may be filtered by a first filter 252 (Filter1) to generate a first set of intermediate images: a darkfield and brightfield image 204, 206, respectively. The first filter 252 may be provided as one or more linear filters in different bandwidths, e.g., high, low, bandpass filters. The first set of intermediate images 202, 204 may then be combined and filtered by a second filter 254 (Filter2) to generate a second intermediate image 208. The second filter 254 may be provided as one or more linear filters. The second intermediate image 208 may be filtered by a third filter 256 (Filter3) to generate a preprocessed image 210. The third filter 256 may be provided as one or more non-linear filters. The preprocessing may make the contrast in the image more pronounced, thus aiding in detecting low-contrast defects in the image as described herein.

Next, techniques to detect defects, including low-contrast defects such as watermarks, in images will be described. The defects may be detected using a supervised machine learning.

Figure 3:
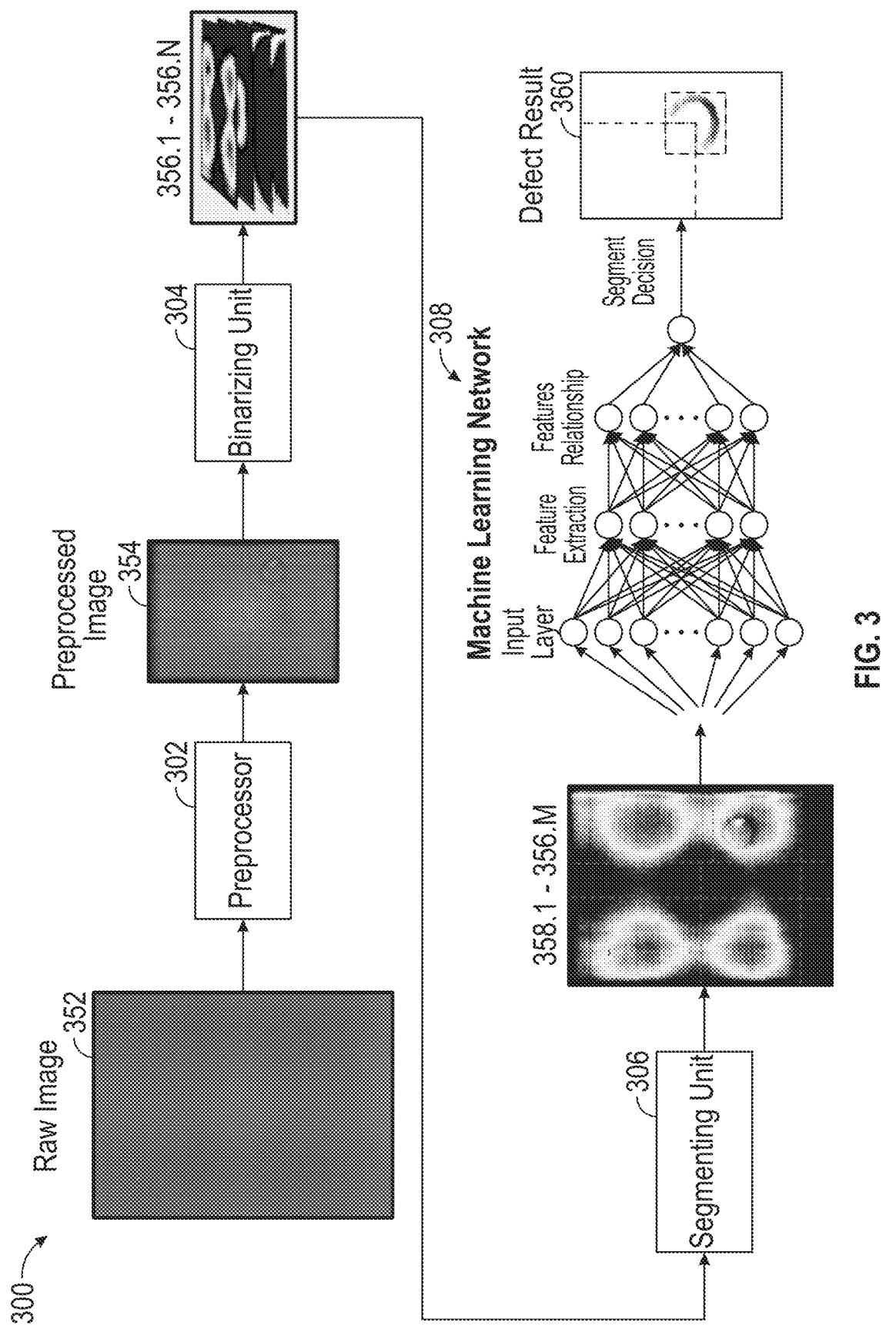
FIG. 3 illustrates a framework to detect defects in an image using a machine learning network, according to an example of the present subject matter.

FIG. 3 illustrates a framework 300 to detect defects in an image using a machine learning network. The framework 300 may be used in a training mode to train the machine learning network and may then be used in normal operation mode to detect defects in images of devices under inspection. Examples of the training and normal operation modes are described later with reference to FIGS. 4 and 5.

The framework 300 may include a preprocessor 302, a binarizing unit 304, a segmenting unit 306, and a machine learning network 308. An initial image 352 (e.g., raw image) may be provided to the preprocessor 302. The preprocessor 302 may filter the initial image 352 to enhance the image contrast and to generate a preprocessed image 354, as described above with reference to FIG. 2 for example. Next, the preprocessed image 354 may be provided to the binarizing unit 304 to binarize the preprocessed image 354 with different thresholds corresponding to different grayscale levels to generate up to n binary slices 356.1-356.n. The number of slices (n) may be programmable and may be set based on sensitively level of the inspection and the type of device to be inspected.

The segmenting unit 306 may segment each slice based on statistical properties of the preprocessed image to generate segments 358.1-358.m. The segmenting may be performed based on the statistical properties relating to contrast of the corresponding region in preprocessed image (e.g., histogram, standard deviation, average, min-max) and statistical properties of each slice (e.g., pixel density, entropy). Thus, each segment may be defined by a contrast profile for that respective region of the image. For example, histogram properties of the preprocessed image and number of bright pixels in slices may be used to define the segments. The histogram properties may represent the approximate distribution of the contrast numerical data. When one region of the image slice differs from another adjacent region, those regions may be defined as different segments. Thus, each segment may include similar contrast properties.

The segmenting unit 306 may also divide the segmented slice 358.1-358.m into two segment groups (or subsets) based on the properties of the segments and corresponding area in preprocessed grayscale image. Segments with a higher contrast profile may be classified as belonging to a first subset, and segments with a lower contrast profile may be classified as belonging to a second subset. The higher or lower contrast profile may be determined based on the contrast properties falling above or below a contrast threshold, respectively.

The first subset of binary segments (e.g., with higher contrast profile) from each segmented slice 358.1-358.m may then be inputted into a machine learning network 308. The machine learning network 308 may be provided as a multi-layered machine learning model. For example, the machine learning network 308 may include four layers with two hidden layers: an input layer, a feature extraction layer, a features relationship layer, and a decision layer. Pixel information from the first subset of segments in each slice may be sent to the input layer. Each node in the input layer may correspond to a pixel of the inputted segment. The machine learning network 308 may, in an iterative fashion, train its biases and coefficients in its layers. The decision layer may output a decision regarding the presence or absence of a defect inside the respective segment. After the segments associated with the first subset for each binary slice is processed with the decision regarding the presence or absence of a defect in the respective segments being generated, a defect result 360 may be generated. The defect result 360 may extract the detected defect from the initial image 352. The defect result 360 may be a binary image showing the detected defect in high contrast. In an embodiment, the defect result 360 may be inputted to an algorithm to classify the defect.

As mentioned above, the framework 300 may first be used in a training mode to train the machine learning network 308 to detect defects and then may be used in a normal operation mode to detect defects in images as part of an inspection process. The training of the machine learning network may be a supervised process and may be performed offsite of where the inspection process is performed. The training may use a set of training images (e.g., one or more training images) with known defects to train the machine learning network.

Figure 4:
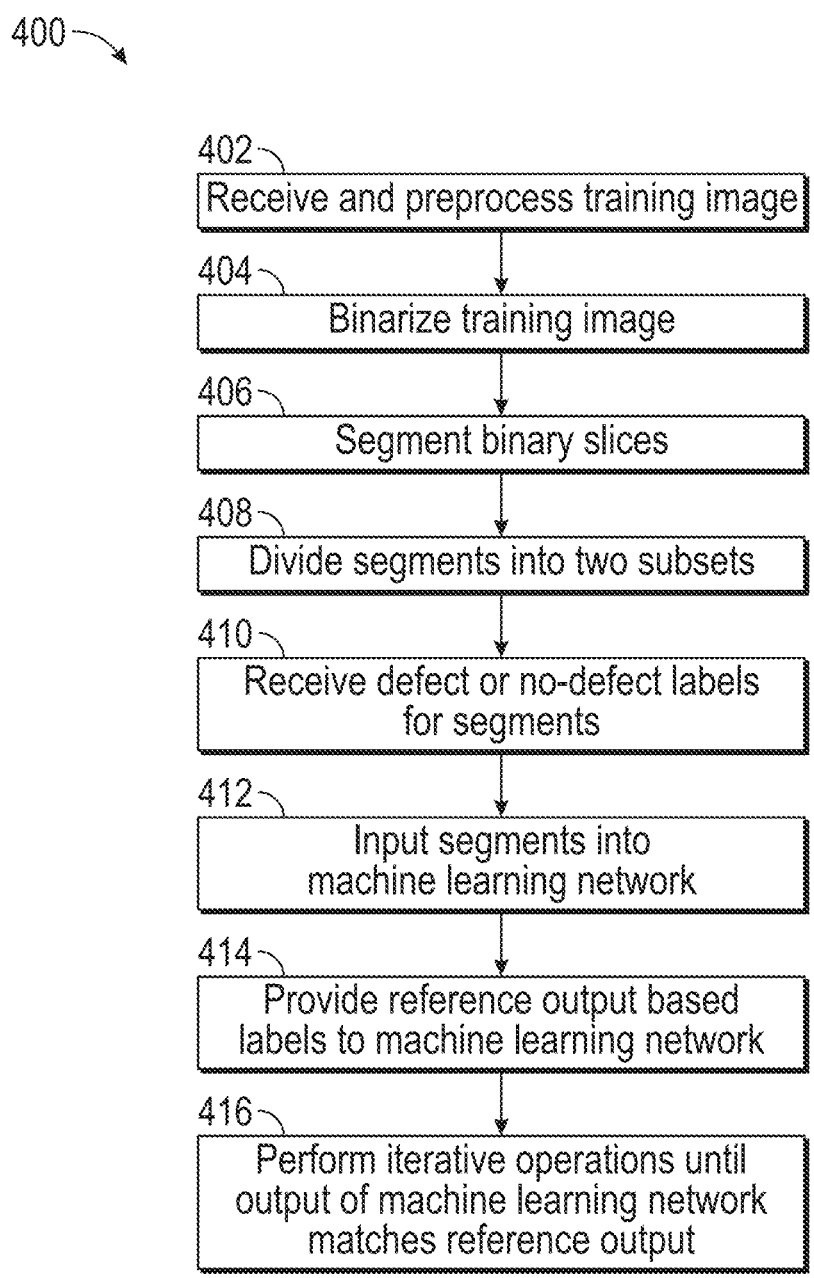
FIG. 4 illustrates a flow diagram of a training process, according to an example of the present subject matter.

FIG. 4 illustrates a flow diagram of a training process 400. The training process 400 may be performed multiple times with a set of training images. At 402, a training image may be received and preprocessed as described above. The training image may correspond to an image of the same or similar type of device to be inspected during normal operation mode. The training images may be selected based on the presence of certain type of defects, such as watermarks, scratches, dirt, etc. The preprocessing may include a series of linear and/or non-linear filtering to enhance the image contrast, as described above.

At 404, the training image may be binarized to generate a plurality of binary slices of the training image. The training image may be binarized with different thresholds corresponding to different grayscale levels. Each binary slice may correspond to a different threshold or grayscale level. The number of thresholds may be programmable and may be set based on sensitivity level of the inspection and the type of device to be inspected.

At 406, each binary slice may be segmented based on statistical properties relating to properties of each slice and corresponding region in the preprocessed image (e.g., histogram, standard deviation, average, min-max). Thus, each segment may be defined by a contrast profile for that respective region of the image. For example, histogram properties of the image may be used to define the segments. The histogram properties may represent the approximate distribution of the contrast numerical data. Thus, each segment may include similar contrast properties. When one region of the image differs from another adjacent region, those regions may be defined as different segments.

At 408, the segments may be divided into two groups or subsets based on the contrast profile of the segments. Segments with a higher contrast profile may be classified as belonging to a first subset, and segments with a lower contrast profile may be classified as belonging to a second subset. The higher or lower contrast profile may be determined using a contrast threshold.

At 410, for each segment a label related to the presence or absence of a defect in that segment may be received. The labels may be generated by a manual process. Segment(s) with known defects may be labeled with a defect label (e.g., "1") and segment(s) without a known defect may be labeled with a no-defect label (e.g., "0").

At 412, the segments may be inputted into the machine learning network, as described herein. At 414, a reference output based on the labels of each segment (e.g., defect or no-defect) of the first subset may be generated and provided to the machine learning network.

At 416, the machine learning network may perform iterative operations until the output of the machine learning network substantially matches the reference output based on the labels. The machine learning network may adjust its biases and coefficients in its layers to generate an output for each segment substantially matching its respective reference output.

Process 400 may be repeated for a set of training images to train the machine learning network. The training images may include different defects to train the machine learning network to detect different type of defects with different characteristics and intensities. After the machine learning network completes the training process, it can be used in normal operation mode to detect defects in images of semiconductor devices during manufacturing.

Figure 5:
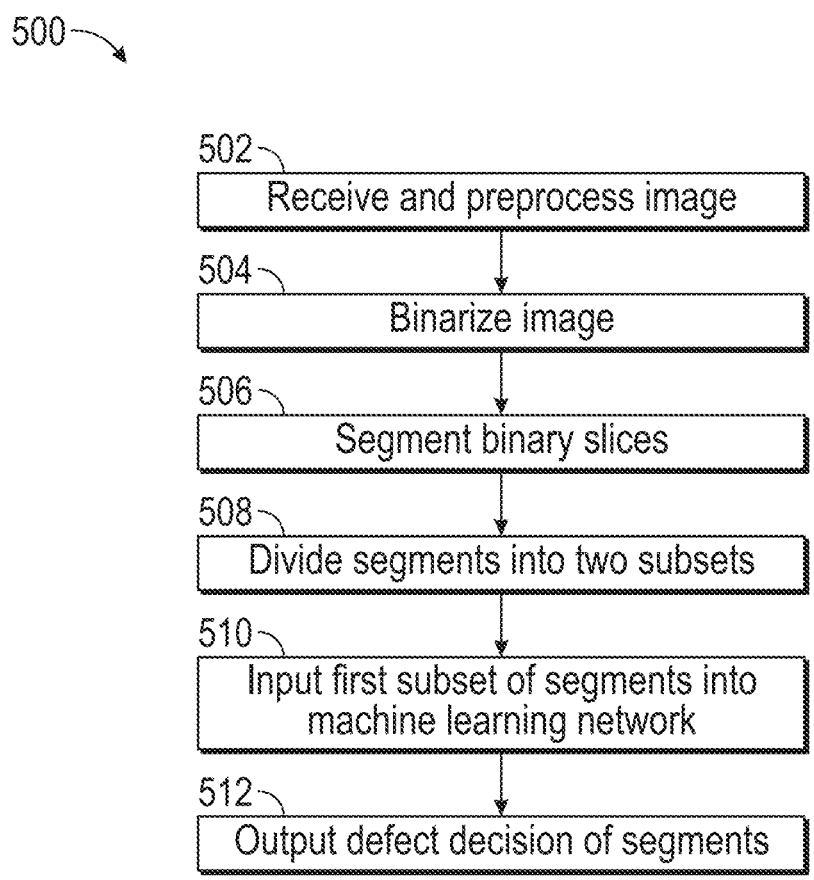
FIG. 5 illustrates a flow diagram of a defect detecting process, according to an example of the present subject matter.

FIG. 5 illustrates a flow diagram of a defect detecting process 500 in normal operation mode. At 502, an image of the device under inspection may be received and preprocessed as described above. The image may be captured by a detector of an inspection system, as described above with reference to FIG. 1. The preprocessing may include a series of linear and/or non-linear filtering to enhance the image contrast, as described above.

At 504, the image may be binarized to generate a plurality of binary slices of the training image. The image may be binarized with different thresholds corresponding to different grayscale levels. Each binary slice may correspond to a different threshold or grayscale level. The number of thresholds may be programmable and may be set based on sensitivity level of the inspection and the type of device to be inspected.

At 506, each binary slice may be segmented based on statistical properties relating to contrast of the preprocessed image and properties of each slice itself (e.g., histogram, standard deviation, average, min-max, entropy). Thus, each segment may be defined by a contrast profile for that respective region of the image. For example, statistical properties of the slices may be used to define the segments. The histogram properties may represent the approximate distribution of the contrast numerical data. Thus, each segment may include similar properties. When one region of the image slice differs from another adjacent region, those regions may be defined as different segments.

At 508, the segments may be divided into two groups or subsets based on the contrast profile of the segments. Segments with a higher contrast profile may be classified as belonging to a first subset, and segments with a lower contrast profile may be classified as belonging to a second subset. The higher or lower contrast profile may be determined using a contrast threshold.

At 510, the first subset of segments (e.g., higher contrast profile) may be inputted into the machine learning network, as described herein. At 512, the machine learning network, based on its training, may perform operations using its layers to output a decision regarding the presence or absence of a defect inside the respective segments. Based on the decision regarding the presence or absence of a defect in the respective segments, a defect result may be generated. The defect result may extract the detected defect from the initial image. The defect result may be a binary image showing the detected defect. The defect result further be classified by a type.

Figure 6:
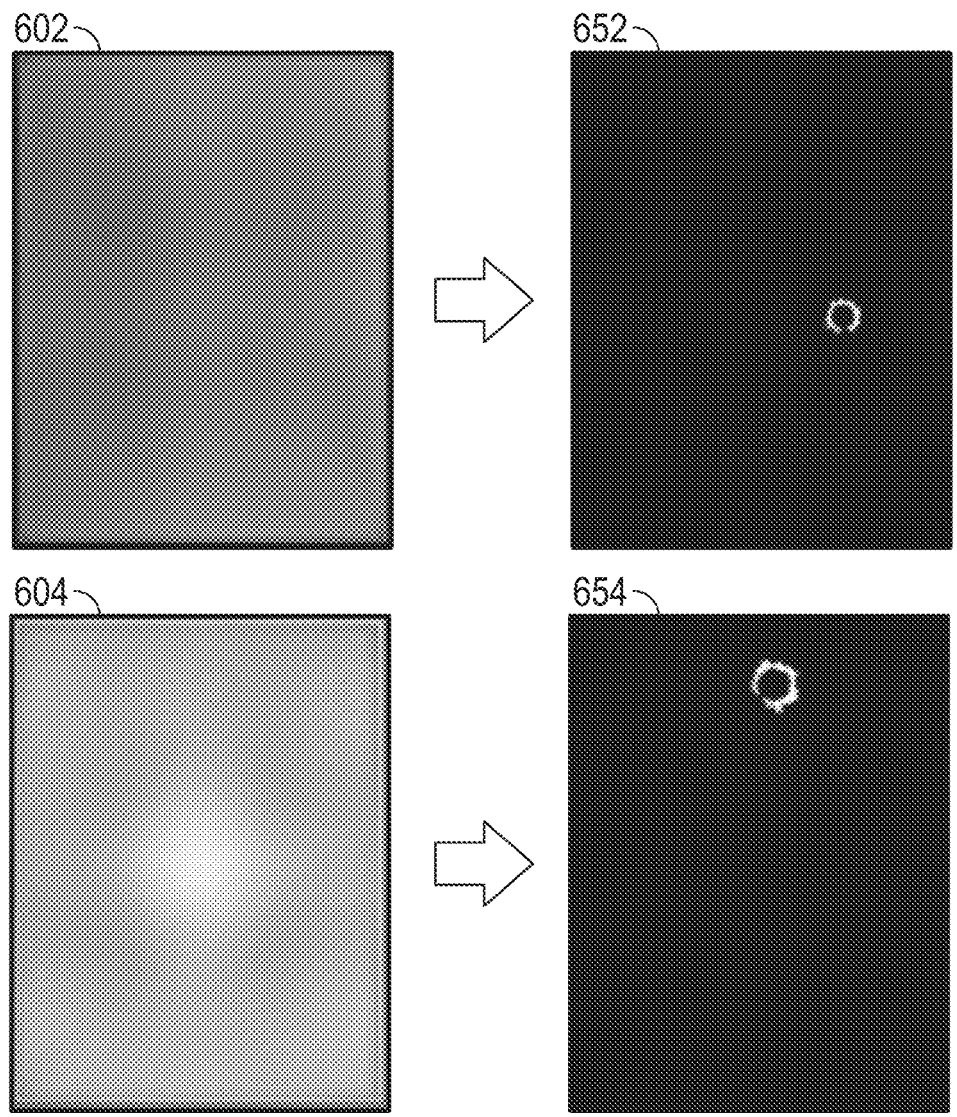
FIG. 6 illustrates defect detection results, according to an example of the present subject matter.

FIG. 6 illustrates examples of results of the defect detection techniques described herein. Raw images 602, 604 show images of devices under inspection, taken by a detector as described above. As shown, defects in the raw images 602, 604 may be difficult to discern. Result images 652, 654 show the results of the defect detection technique using a trained machine learning network as described herein. For example, result images 652, 654 show watermark defects in a binary image with the defects in white.

As described herein, the binarization and segmentation of the inputs of the machine learning network increase the speed of the detection technique. By using a subset of the segments (rather than the entire image), the operation and training of the machine learning network can be performed faster and using fewer computing resources. The machine learning network can generate binary images, in which the defects, including low-contrast defects, are more readily discernable. For example, a wafer including five thousand separate dies can be inspected using the detection techniques described herein in a few milliseconds.

Figure 7:
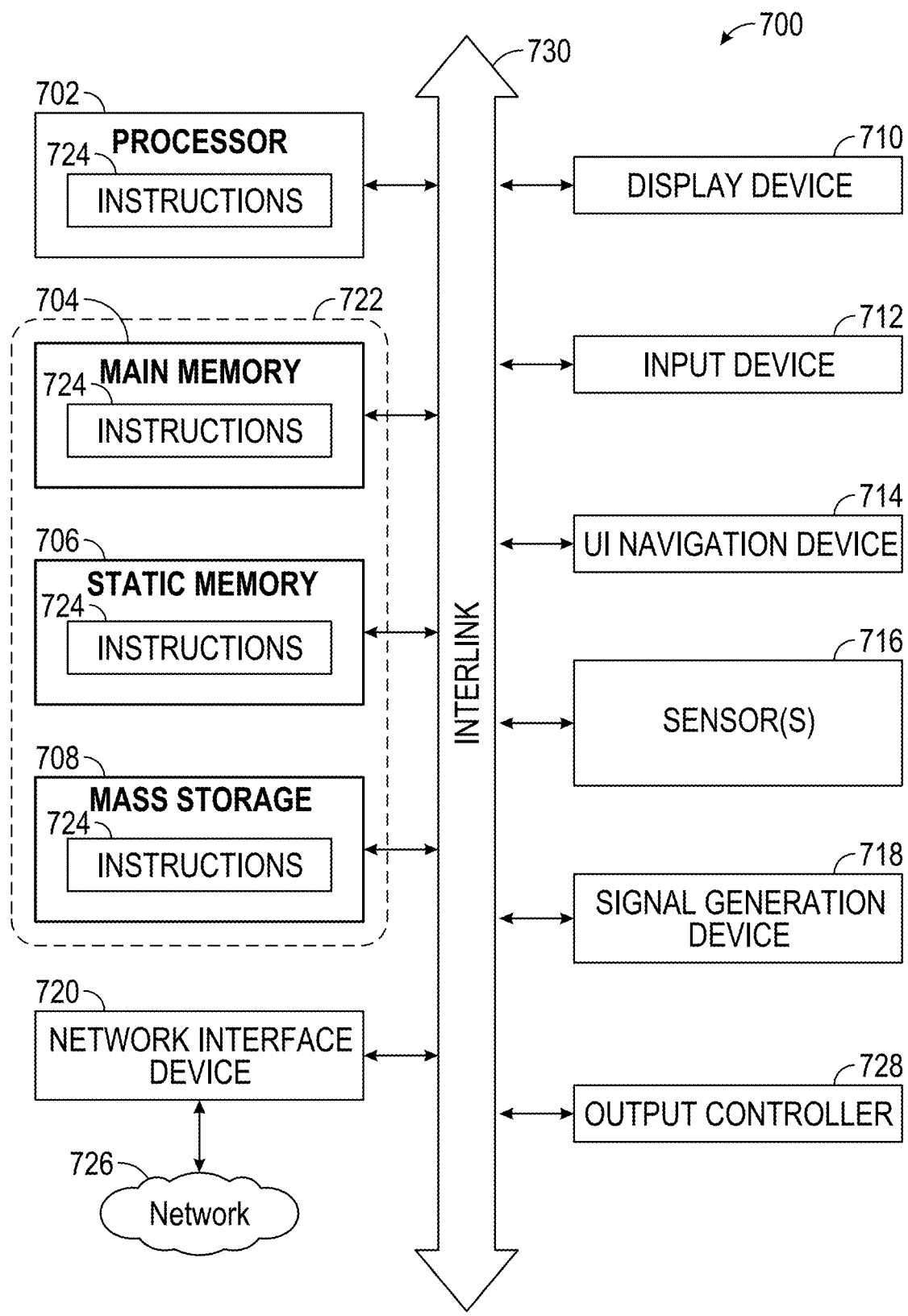
FIG. 7 illustrates a block diagram of an example comprising a machine upon which any one or more of the techniques (e.g., methodologies) discussed herein may be performed.

The techniques shown and described in this document can be performed using a portion or an entirety of an inspection system 100 as shown in FIG. 1 or otherwise using a machine 700 as discussed below in relation to FIG. 7. FIG. 7 illustrates a block diagram of an example comprising a machine 700 upon which any one or more of the techniques (e.g., methodologies) discussed herein may be performed. In various examples, the machine 700 may operate as a stand-alone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 726, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 722 may include a machine readable medium on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 722 may constitute machine readable media.

While the machine readable medium is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.22 family of standards known as Wi-Fi®, IEEE 802.26 family of standards known as WiMax®), IEEE 802.25.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations.

What is claimed is:

1. A method to detect a defect in a semiconductor device, the method comprising:
    generating a plurality of binary slices of an image of the semiconductor device;
    segmenting each binary slice of the plurality of binary slices into segments based on statistical contrast properties of the image;
    inputting a subset of the segments into a machine learning network, wherein the subset of the segments include segments with a higher contrast profile as compared to other segments not included in the subset; and
    receiving an output of the machine learning network identifying presence or absence of at least one defect in the image.

2. The method of claim 1, wherein the machine learning network includes a multi-layered machine learning model, and wherein each binary slice corresponds to a different grayscale level.

3. The method of claim 1, wherein the machine learning network is trained to detect defects using a supervised machine learning technique with at least one training image by:
    generating a plurality of binary slices of the at least one training image to create training image slices;
    segmenting each slice of the training image slices based on statistical contrast properties of the at least one training image to generate training segments;
    receiving a defect label for the training segments with a known defect and receiving a no-defect label for one or more segments without the known defect;
    inputting the training segments into the machine learning network; and
    providing a reference output to the machine learning network based on the labels of the training segments, wherein the machine learning network performs iterative operations until its output matches the reference output.

4. The method of claim 1, wherein the defect is a low-contrast watermark defect.

5. The method of claim 1, further comprising:
    transforming the image to enhance at least one feature of the image; and
    preprocessing the image, including filtering the image with a series of linear and non-linear filters.

6. The method of claim 1, wherein the statistical contrast properties are defined by one or more of histogram, ranges, standard deviation, min-max, average, or ratio of dark to light pixels.

7. The method of claim 1, wherein the method is performed using a graphic processing unit (GPU) and a computer processing unit (CPU).

8. The method of claim 1, wherein the plurality of binary slices are generated using different thresholds corresponding to different grayscale levels, wherein each binary slice corresponds to a different grayscale level.

9. An inspection system comprising:
    a detector to capture an image of a semiconductor device;
    one or more processors of a machine; and
    a memory storing instructions that, when executed by the one or more processors, cause the machine to perform operations comprising:
        generating a plurality of binary slices of the image of the semiconductor device;
        segmenting each binary slice of the plurality of binary slices into segments based on statistical contrast properties of the image;
        inputting a subset of the segments into a machine learning network, wherein the subset of the segments include segments with a higher contrast profile as compared to other segments not included in the subset; and
        receiving an output of the machine learning network identifying presence or absence of at least one defect in the image.

10. The inspection system of claim 9, wherein the machine learning network includes a multi-layered machine learning model, and wherein each binary slice corresponds to a different grayscale level.

11. The inspection system of claim 9, wherein the machine learning network is trained to detect defects using a supervised machine learning technique with at least one training image by:
    generating a plurality of binary slices of the at least one training image to create training image slices;
    segmenting each slice of the training image slices based on statistical contrast properties of the at least one training image to generate training segments;

receiving a defect label for the training segments with a known defect and receiving a no-defect label for one or more segments without the known defect;

inputting the training segments into the machine learning network; and providing a reference output to the machine learning network based on the labels of the training segments, wherein the machine learning network performs iterative operations until its output matches the reference output.

12. The inspection system of claim 9, wherein the defect is a low-contrast watermark defect.

13. The inspection system of claim 9, the operations further comprising:

transforming the image to enhance at least one feature of the image; and preprocessing the image, including filtering the image with a series of linear and non-linear filters.

14. The inspection system of claim 9, wherein the statistical contrast properties are defined by one or more of histogram, ranges, standard deviation, min-max, average, or ratio of dark to light pixels.

15. The inspection system of claim 9, wherein the one or more processors include graphic processing unit (GPU).

16. The inspection system of claim 9, wherein the plurality of binary slices are generated using different thresholds corresponding to different grayscale levels, wherein each binary slice corresponds to a different grayscale level.

17. A non-transitory machine-storage medium embodying instructions that, when executed by a machine, cause the machine to perform operations comprising:

generating a plurality of binary slices of an image of a semiconductor device;

segmenting each binary slice of the plurality of binary slices to create segments based on statistical contrast properties of the image;

inputting a subset of the segments into a machine learning network, wherein the subset of the segments include segments with a higher contrast profile as compared to other segments not included in the subset; and receiving an output of the machine learning network identifying presence or absence of at least one defect in the image.

18. The non-transitory machine-storage medium of claim 17, wherein the machine learning network includes a multi-layered machine learning model, and wherein each binary slice corresponds to a different grayscale level.

19. The non-transitory machine-storage medium of claim 17, wherein the machine learning network is trained to detect defects using a supervised machine learning technique with at least one training image by:

generating a plurality of binary slices of the at least one training image to create training image slices;

segmenting each slice of the training image slices based on statistical contrast properties of the at least one training image to generate training segments;

receiving a defect label for the training segments with a known defect and receiving a no-defect label for one or more segments without the known defect;

inputting the training segments into the machine learning network; and providing a reference output to the machine learning network based on the labels of the training segments, wherein the machine learning network performs iterative operations until its output matches the reference output.

20. The non-transitory machine-storage medium of claim 17, wherein the defect is a low-contrast watermark defect.

21. The non-transitory machine-storage medium of claim 17, further comprising:

preprocessing the image, including filtering the image with a series of linear and non-linear filters.

22. The non-transitory machine-storage medium of claim 17, wherein the statistical contrast properties are defined by one or more of histogram, ranges, standard deviation, min-max, average, or ratio of dark to light pixels.

23. The non-transitory machine-storage medium of claim 17, wherein the plurality of binary slices are generated using different thresholds corresponding to different grayscale levels, wherein each binary slice corresponds to a different grayscale level.

* * * * *

UNITED STATES PATENT AND TRADEMARK OFFICE
CERTIFICATE OF CORRECTION

| | | |
|---|---|---|
| PATENT NO. | : 12,354,254 B2 | Page 1 of 1 |
| APPLICATION NO. | : 17/867444 | |
| DATED | : July 8, 2025 | |
| INVENTOR(S) | : Roman S. Basistyy, Jatinder Dhaliwal and Jian Ding | |

It is certified that error appears in the above-identified patent and that said Letters Patent is hereby corrected as shown below:

In the Specification

Column no 03 Line no 44-45, "(e.g., at a 450 angle with regard to the surface normal)" to read as, "(e.g., at a 45° angle with regard to the surface normal)".

Signed and Sealed this
Sixth Day of January, 2026

John A. Squires
*Director of the United States Patent and Trademark Office*